United States Patent [19]

Suzuki

[11] 4,289,614

[45] Sep. 15, 1981

[54] SPROUTING BEANS REFINEMENT APPARATUS

[75] Inventor: Tomosaburo Suzuki, Tokyo, Japan

[73] Assignee: Kabushiki Kaisha Daisei Kikai, Tokyo, Japan

[21] Appl. No.: 102,914

[22] Filed: Dec. 12, 1979

[30] Foreign Application Priority Data

Mar. 6, 1979 [JP] Japan .................................. 54-25752
Mar. 6, 1979 [JP] Japan .................................. 54-25753

[51] Int. Cl.³ ............................................... B07B 1/10
[52] U.S. Cl. .................................... 209/308; 209/314; 209/365 R; 209/366.5; 209/387; 209/389; 47/61
[58] Field of Search ............... 47/61; 209/385, 387, 209/389, 307, 308, 314, 325, 326, 365 R, 366.5

[56] References Cited

U.S. PATENT DOCUMENTS

| 816,821 | 4/1906 | Prinz | 209/389 |
| 2,183,233 | 12/1939 | Zink | 209/307 X |
| 2,974,798 | 3/1961 | Ruzicka | 209/325 X |
| 3,642,133 | 2/1972 | Venanzetti | 209/314 |
| 4,076,124 | 2/1978 | Taysom et al. | 209/308 X |
| 4,146,483 | 3/1979 | Lee | 209/308 X |

Primary Examiner—Ralph J. Hill
Attorney, Agent, or Firm—Oblon, Fisher, Spivak, McClelland & Maier

[57] ABSTRACT

The present invention provides a sprouting bean refinement apparatus including a vibration frame with its bottom plate composed of a perforated screen, a vibrator for providing vibration to the vibration frame, and a cleaning mechanism contacted with the perforated screen so that relative sliding motion is generated between the cleaning mechanism and the perforated screen to remove deposits on the top side of the perforated screen.

5 Claims, 8 Drawing Figures

SPROUTING BEANS REFINEMENT APPARATUS

BACKGROUND OF THE INVENTION

1. Field of the Invention

A sprouting bean refinement apparatus is provided such that sprouting beans remaining after such harvest are put on the vibration frame, and refuse, bean shells, rootlets and the like deposited on the sprouting beans are separated therefrom to refine the sprouting beans, and which works reliably and continuously because the refuse, shells, rootlets and the like deposited onto the perforated screen of the vibration frame are removed from the surface of the perforated screen by the cleaning mechanism.

2. Description of the Prior Art

Sprouting beans obtained by harvesting the beans in the state that their stalks have grown up to given lengths are utilized as one kind of edible vegetable.

In the harvested sprouting beans, unnecessary materials such as shells and refuse of raw beans and rootlets are contained in an amount so high as to constitute about 10% by weight. It is desired to remove these unnecessary materials from the harvested sprouting beans.

In order to remove these unnecessary materials from harvested sprouting beans, there has hitherto been applied a method comprising dipping the sprouting beans into a water tank with a great deal of water stored therein to remove bean shells and refuse and the like through sedimentation.

According to such a conventional method, however, it is necessary to use an extremely large amount of water and further to provide a wide space for placing a water tank of large size in a factory. Furthermore, a serious drawback of the conventional method is that the sprouting beans subjected to washing with water are strikingly deteriorated in their freshness-keeping property.

SUMMARY OF THE INVENTION

The object of the present invention is to provide a efficient sprouting bean refinement apparatus for removing refuse, bean shells, rootlets and the like admixed in the harvested sprouting beans, to thereby refine the sprouting beans.

The sprouting bean refinement apparatus according to the present invention comprises a vibration frame with its bottom plate composed of a perforated screen, a vibrator for generating vibration to said vibration frame, and cleaning means contacted with the perforated screen so that relative sliding motion is provided between the cleaning means and the perforated screen to remove deposits on the top side of the perforated screen.

In order to generate sliding motion between the cleaning means and the perforated screen, the refinement apparatus is constructed such that the cleaning means is reciprocated in contact with the perforated screen along the top side thereof, or such that the perforated screen is made up of an endless belt continuously moved in one direction and wherein the cleaning means is statically located and which is contacted with the perforated endless belt to remove deposits on its top side.

In anyone of the above cases, in addition, the bottom plate composed of a perforated screen may be constructed in a multistage fashion, with stepwise falls or levels provided thereon, wherein when sprouting beans conveyed on the screen fall through the falls or levels, the upper and lower layers thereof are turned over to effect good refinement of the sprouting beans.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
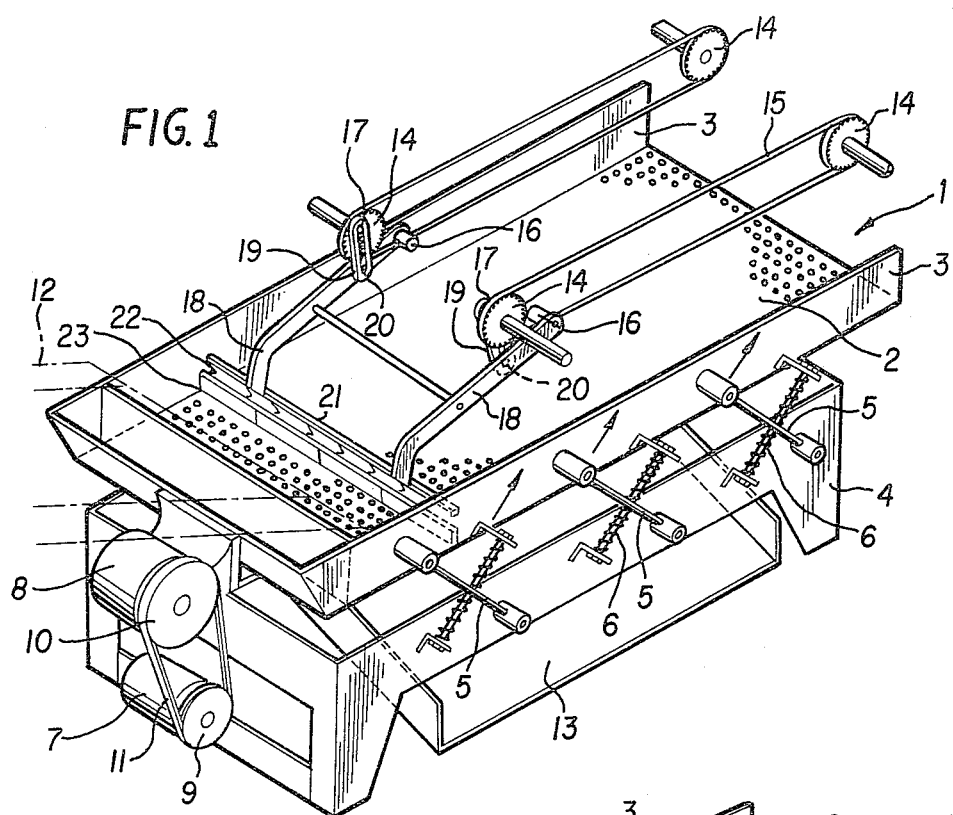
FIG. 1 is a perspective view showing the first embodiment of the apparatus according to the present invention.

In FIG. 1, reference numeral 1 represents a box-shaped vibration frame, with its bottom side composed of a perforated screen 2 which has side guides 3 upstanding on both its edges.

A table-shaped stand frame 4 is placed under or mounted on the vibration frame 1. The stand frame 4 and vibration frame 1 are connected to each other by means of three pairs of levers 5 inclinedly arranged in parallel on both sides, both ends of which are pivotally secured to both the frames.

Between the stand frame 4 and vibration frame 1, three springs or biasing members 6 are inclinedly provided on each side so that they intersect almost at right angles to the levers 5, both ends of which are mounted on each of the frames.

Reference numeral 7 represents a motor mounted on the stand frame 4 and reference numeral 8 represents a vibrator mounted on the vibration frame 1. Pulleys 9, 10 are fixed repectively on the rotation shafts of the motor 7 and vibrator 8, and a V-belt 11 is stretched between both the pulleys 9, 10 so that rotation of the motor 7 is transmitted to the vibrator 8 to vibrate the vibrator 8.

A chute 12 for feeding sprouting beans to be refined onto the perforated screen 2 which constitutes the bottom side of the vibration frame 1 is arranged leftward above the vibration frame 1. A refuse receiver 13 is inclinedly arranged in the form of a sink under the perforated screen 2.

Over the vibration frame 1 four sprockets 14 are rotatably supported by proper means so as to be oriented in parallel with the side guides 3, and a chain 15 is stretched over each pair of the sprockets on both sides. A rotating force is generated to one of the sprockets in each pair by proper means so that the chain 15 is placed in motion.

Two pins 16, 17 are fixed at an interval on each of the chains 15, and a lever 18 is pivotally secured, at one end thereof, on each of the pins 16. One end of an expandable damper 19 is pivotally secured to each of the pins 17 and the other end of the damper 19 is pivotally secured by a pin or similar member 20 on the lever 18. The other ends of the levers 18 are connected with each other by a bar 21 which is almost the same length as the width of the screen 2. A scraper 23 divided into a plurality of parts is mounted on the back side of the bar 21 by means of of a plurality of push springs 22, and the scraper 23 is disposed so as to be in contact with the top side of the perforated screen 2.

The operation of the above-mentioned apparatus will now be described. Onto the vibration frame 1 sprouting beans to be refined are thrown from the chute 12. The vibration frame 1 is vibrated by the action of the vibrator 8 driven through the rotation of the motor 7, and the vibration frame 1 is then vibrated so as to throw the sprouting beans on the screen 2 upwards to the right hand side in the direction of the arrows (i.e. in the direction toward the upper right side of FIG. 1) by the action of the inclined levers 5 and springs 6 arranged between the vibration frame 1 and stand frame 4.

Through the vibration of the vibration frame 1, the sprouting beans are conveyed rightward on the screen 2 while being upwardly thrown with mincing steps to the right hand side. During this conveying, bean shells, refuse, rootlets and the like admixed with and deposited in the sprouting beans to be refined are removed and made to drop and be discharged through the holes of the screen 2 onto the refuse receiver 13. The refined sprouting beans are then discharged from the right end of the screen 2.

During operation of this refinement, bean shells, refuse, rootlets and the like are deposited onto the screen 2. However, these deposits are scraped away by means of a scraper 23 mounted on the lower ends of the levers 18 and which is moved while being biased downwardly by dampers 19 as the chains 15 travel to thereby prevent clogging of the screen 2 from occurring.

The first embodiment according to the present invention has thus been described hereinabove. As a matter of course, there may be adopted various mechanisms other than the mechanism shown in the drawing in order that vibration in the direction of the arrows occurs in the vibration frame 1. The vibrator 8 may, for example, be also properly changed to a cam-type or crank-type vibrator.

As a mechanism for cleaning up the screen 2, in addition, there may be properly selected another mechanism, for example, using a piston and cylinder or the like, other than the mechanism using the chains 15 and levers 18 shown in FIG. 1.

Figure 2:
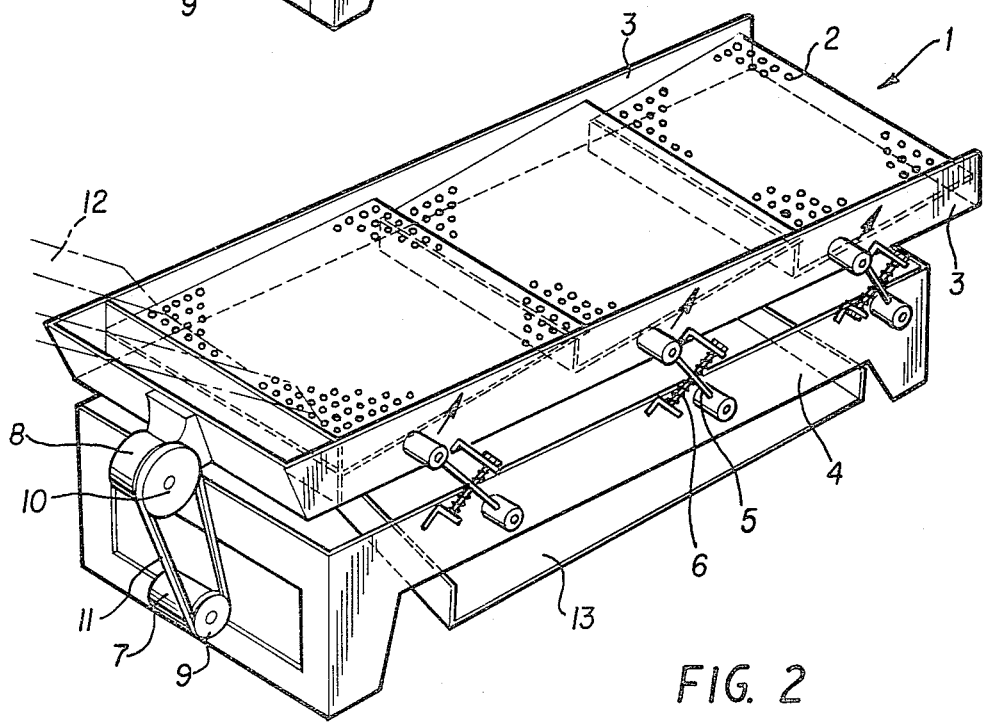
FIGS. 2 and 3 are a perspective view and side elevation showing the second embodiment, respectively.
Figure 3:
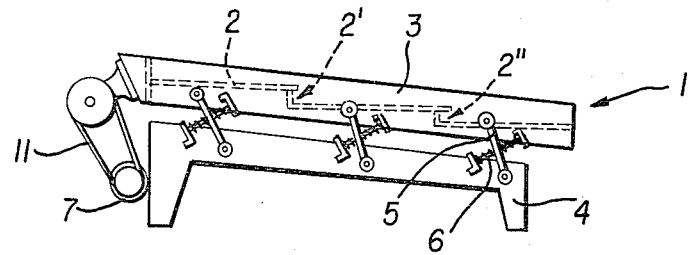

In the embodiment shown in FIG. 2 and FIG. 3, the perforated screen 2 which forms the bottom side of the vibration frame 1 is discontinuously designed with falls or levels 2', 2'' stepwise provided. The composition of the other parts are the same as described with reference to FIG. 1, and the corresponding parts are designated by the same reference numerals and are thus omitted in the following explanation. In FIG. 3, the chute 12, refuse receiver 13, scraper 23 and the like are, accordingly, omitted for simplification of the drawing.

Since the perforated screen 2 is formed stepwise in the apparatus shown in FIGS. 2 and 3, the sprouting beans conveyed onto the screen 2, while thrown with mincing steps, are made to fall or drop, like a waterfall, at two falls or levels 2', 2'', and the upper and lower layer parts thereof are turned over so that the sprouting beans which have been in the upper layer part are transferred onto the lower layer part and contact with the screen 2, whereby bean shells and refuse deposited thereon are thoroughly removed. By the apparatus of this embodiment, accordingly, the sprouting beans can be refined more uniformly.

According to the tests carried out by employing the actual apparatus conceived by the inventor of this application, usual sprouting beans, so-called "mappe" in Japan, were conveyed throughout a travelling length of 3 m for 12–13 seconds, while being vibrated with an amplitude of 10–15 mm and a frequency of 300–450 per minute, by use of a screen having a large number of round holes of 8 mm diameter provided at intervals of 13 mm between their centers. Thus, the shells, refuse, rootlets and the like of the sprouting beans could be, in fact, removed surprisingly well. In addition, good results were obtained in any case that the holes of the screen were formed in a round or rectangular shape.

Furthermore, in these tests in which falls or levels with a height of 10 cm were provided at intervals of 1 m on the screen, the complete refinement of the sprouting beans was achieved. Only by scraping the screen one time per several minutes for its cleaning were satisfactory results obtained.

According to the apparatus of the present invention as described in detail hereinabove, the refinement of sprouting beans can be simply conducted with highly desirable effects but without the use of a water tank of large size, a great amount of water and without employing many laborers so as to differ from conventional apparatuses.

According to the present apparatus, furthermore, sprouting beans are refined without using water so as to differ from conventional apparatuses and, therefore, the sprouting beans left after refinement have a very good freshness-keeping property.

Figure 6:
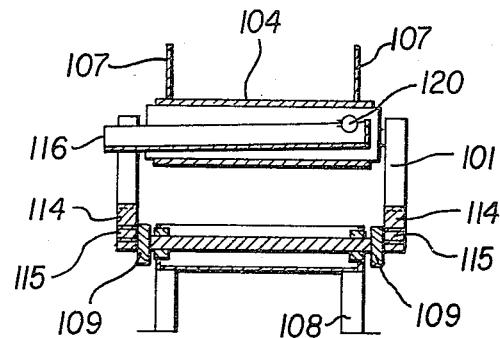
FIG. 6 is a sectional view taken along the line VI—VI of FIG. 5.
Figure 4:
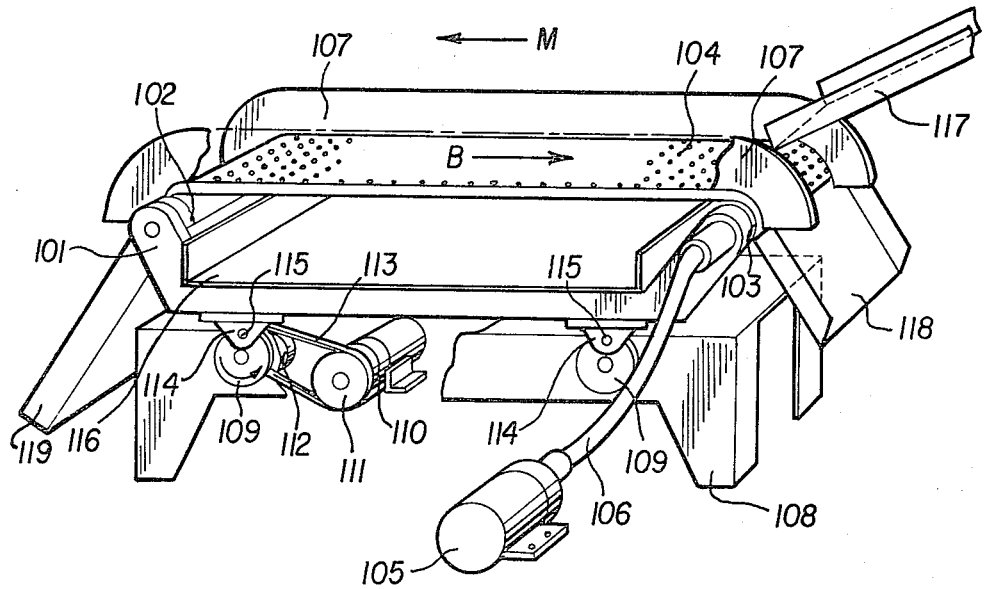
FIG. 4 is a perspective view, cutaway in part, showing the third embodiment of the apparatus according to the present invention.
Figure 5:
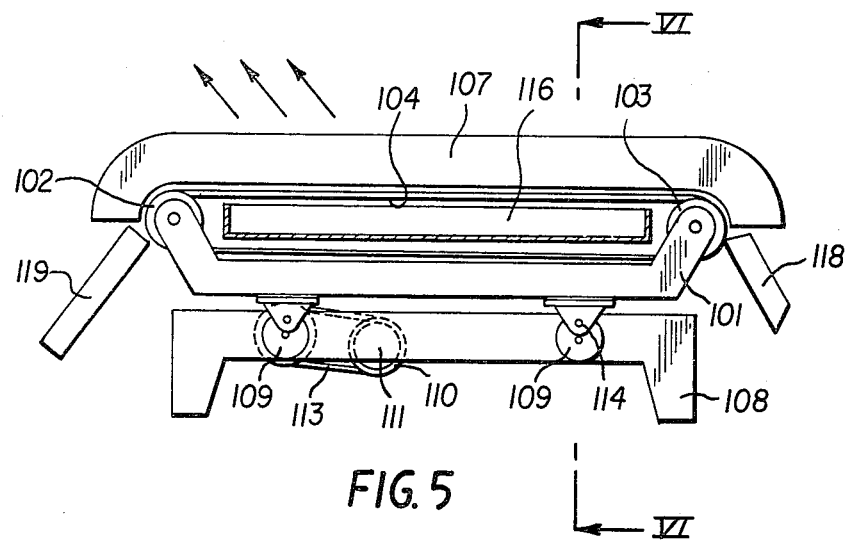
FIG. 5 is a side elevation of the third embodiment.

In FIGS. 4 to 6, reference numeral 101 represents a framework which forms the vibration frame having rollers 102, 103 rotatably journalled thereon.

A perforated endless belt 104 is stretched over and between the rollers 102, 103 with the roller 103 being connected with a geared motor 105 by way of a flexible shaft 106 and being rotated by rotation of the geared motor 105 so that the perforated endless belt 104 is caused to travel in the direction of arrow B shown in FIG. 4. On the vibration frame 101, side guides 107 are provided which are upstanding along both the edges of the perforated endless belt.

A stand frame 108 is provided under the vibration frame 101, and two pairs of crank discs 109 are rotatably journalled symmetrically to right and left on the sides of the stand frame 108. A geared motor 110 is mounted under the stand frame 108 and a pulley 111 is fixed on the rotation shaft of this geared motor.

A pulley 112 is fixed on the shaft on which the left crank disc 109 is fixed, and a driving belt 113 is stretched over and between the pulleys 111 and 112 so that the crank disc 109 may be rotated in the direction of the arrow by rotation of the geared motor 110.

On the back side of the vibration frame 101, four bearings 114 are fixed for the crank disc 109 of the stand frame 108, and pins 115 journalled on the bearings 114 are eccentrically fixed on the crank disc 109. When the geared motor 110 is rotated so that the crank disc 109 is caused to rotate in the direction of the arrow by the driving belt 113, the vibration frame 101 is therefore vibrated through crank motion between the crank disc 109 and the pin 115 eccentrically fixed thereon from the center of rotation.

As for the geared motor 110, a motor is used with a periodical speed change gear for periodically changing its rotation speed in one rotation and is so adjusted as to provide a fast rotating speed to the pulley 109 when upward displacement of the vibration frame 101 is to occur.

Between the upper and lower travelling zones of the perforated endless belt 104, a refuse receiver 116 in inclinedly arranged, like a sink, with its discharge side directed downward. On one end portion of the upper travelling zone of the perforated endless belt 104, a chute 117 is arranged through which sprouting beans to be refined are caused to drop onto the belt 104 in this travelling zone, and under the chute 117, a refuse take-out chute 118 is arranged which has a scraper with one end contacted with the travelling face of the endless belt 104.

A chute 119 is arranged on the opposite side of the travelling zone of the endless belt 104 for discharge of the sprouting beans. Along the higher side wall of the inclined refuse receiver 116, a shower member 120 is provided for washing away refuse which has fallen onto the refuse receiver 116.

The working of the apparatus which has the above-mentioned construction will now be described. Sprouting beans to be refined are fed from the chute 117 onto the perforated endless belt 104 which is made to travel in the direction of the arrow by the driving force from the geared motor 105.

The vibration frame 101 with the endless belt 104 mounted thereon is operated at a high speed so as to be vibrated when it is displaced upwardly by the working of the crank disc 109 rotated by the geared motor 110 with the periodical speed change gear. Then, the sprouting beans carried on the endless belt 104 are vibrated such that they may be thrown aslant-upwardly as shown by the arrows in FIG. 5.

Insofar as the endless belt 104 is travelling in the direction of the arrow B, the sprouting beans on the belt 104 are accordingly conveyed as they are thrown out, with mincing steps, in the direction of the arrow M.

When the sprouting beans are conveyed with such motion from the endless belt 104, foreign matter, such as bean shells, rootlets, refuse and the like admixed in the sprouting beans are separated from the sprouting beans and made to drop through the holes of the endless belt 104 onto the refuse receiver 116. Then, the sprouting beans thus finely refined are discharged out of the chute 119. The bean shells, rootlets and the like which have fallen onto the refuse reveiver 116 are washed away by the shower member 120.

Since the bean shells and the like which have clogged the holes of the perforated endless belt 104 are removed by the refuse take-out chute 118 as a result of the scraper being contacted with the belt, the endless belt 104 is again returned to the travelling zone, with its face thus cleaned.

In the above-mentioned embodiment, in addition, the bean shells, refuse and the like deposited onto the perforated endless belt 104 are removed by the refuse take-out chute 118 with the scraper. In place of this scraper, however, there may be adopted a brush or means in proper form, in short, which is capable of removing the refuse from the belt 104.

It is needless to say that a scraping-out board or proper means may also be adopted for the shower member 120 for washing away the refuse which has fallen onto the refuse receiver 116.

Although the travelling direction of the endless belt 104 and the conveying direction of the sprouting beans are reverse in the apparatus shown in the FIGS. 4–6, each of them may be arranged to convey in the same direction.

In the embodiment mentioned above, furthermore, the crank mechanism which employs the geared motor 110 with the periodical speed change gear as its driving source is used for vibrating the vibration frame 101. In this regard, proper means may be also adopted, in short, which is capable of generating to the sprouting beans on the belt 104 such vibration that a throwing-up motion with mincing steps is applied to them.

Figure 7:
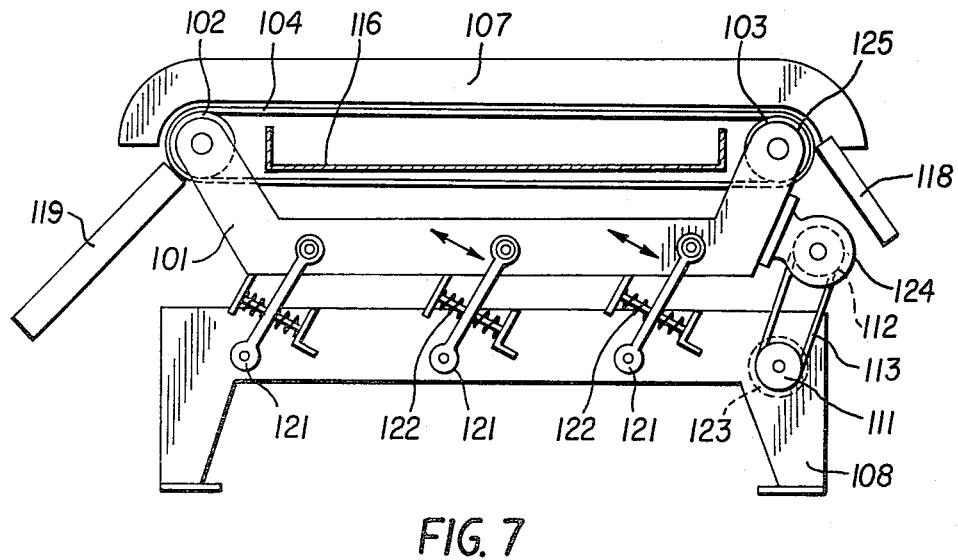

FIG. 7 shows another vibrating mechanism for the vibration frame 101. In FIG. 7, the vibration frame 101 is connected to the stand frame 108 by means of three pairs of parallel and inclined levers 121 pivotally secured on both sides thereof, and compression springs 122 are arranged in such a direction that they intersect at right angles with the levers 121 interconnecting the frames 101 and 108.

Reference numeral 123 represents a motor mounted on the stand frame 108 and reference numeral 124 represents a vibrator mounted on the vibration frame 101. A belt 113 is stretched over and between the pulleys 111, 112 fixed on the rotation shafts of the motor 123 and the vibrator 124. Reference numeral 125 represents a pulley with a motor contained therein which generates a driving force for motion of the belt 104.

The other compositions are the same as those shown in FIGS. 4 to 6, and corresponding parts are designated with the same numbers as those in FIGS. 4 to 7 and such are therefore omitted in the following explanation.

In the apparatus shown in FIG. 7, the vibrator 124 is driven to vibrate the vibration frame 101 when the motor 123 is rotated. Since the vibration frame 101 and the stand frame 108 are connected with each other by the pivotally secured levers 121 and the inclined springs 122 are made to intervene therebetween, in this case, vibration in the direction of the arrows shown in FIG. 7 is provided to the vibration frame 101 through the vibration generated by the vibrator 124.

By this vibration, the throwing-up motion with mincing steps which moves the sprouting beans on the endless belt 104 in the direction of the discharging chute 119 is caused as described with reference to FIGS. 4 to 6.

According to the tests carried out by using the actual apparatus conceived by the inventors, usual sprouting beans, again so-called "mappe" in Japan, were conveyed throughout a travelling length of 3 m for 12–15 seconds, while being vibrated with an amplitude of 10–15 mm and a frequency of 300–450 per minute, by use of an endless belt, made of rubber or plastic, having a large number or round holes of 8 mm in diameter provided at intervals of 13 mm along their centers. Thus, the bean shells, refuse, rootlets and the like of the sprouting beans could be also removed surprisingly well. As to the shape of the holes of the endless belt 104, in addition, there could also be selected proper shapes other than a round shape.

According to the present invention, continuous refinement of sprouting beans with good efficiency is achieved because the surface of the belt can be continuously maintained clean by the cleaning means.

Figure 8:
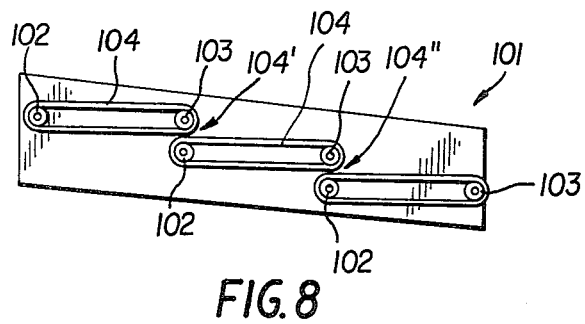
FIGS. 7 and 8 are side elevations showing the fourth and fifth embodiments, respectively.

In the apparatus mentioned above, only one perforated endless belt is used. As shown in FIG. 8, however, a plurality of endless belts 104 may be used which are arranged in such a manner that falls or levels 104', 104" of about 10 cm are formed at the end of each endless belt 104. In this case, the sprouting beans which are being conveyed on the endless belts 104 are caused to drop, at these falls 104', 104", and the upper and lower layer parts thereof are turned over so that the sprouting beans which have still been in the upper layer part fall onto the lower layer part and contact with the belt 104 whereby bean shells and refuse deposited thereon are uniformly well removed.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A sprouting bean refinement apparatus comprising:
    a vibration frame including a perforated screen, said perforated screen comprising a perforated endless belt and further comprising a driving device for driving the endless belt in one direction and cleaning means arranged so as to face said endless belt and statically placed so as to remove deposits on the endless belt;
    a vibrator operatively associated with said vibrator frame for generating vibration in a direction having a component opposite said one direction to said vibration frame; and
    said cleaning means contacting said perforated screen such that relative sliding motion is generated between the cleaning means and the perforated screen to thereby remove deposits on the top side of the perforated screen.

2. A sprouting beans refinement apparatus as set forth in claim 1, said vibrator comprising:
    at least one crank disc member;
    a pin member eccentrically mounted on said at least one crank disc and connected to said vibration frame; and
    means for rotating said at least one crank disc member.

3. A sprouting beans refinement apparatus as set forth in claim 1, further comprising:
    a stand frame upon which said vibrator frame is mounted, said vibrator comprising a motor and pulley assembly interconnecting said stand frame and said vibrator frame.

4. A sprouting beans refinement apparatus according to claim 1, said screen comprises a plurality of screens being arranged in a stepwise manner.

5. A sprouting beans refinement apparatus as set forth in claim 1 further comprising:
    a stand frame upon which said vibration frame is mounted;
    a plurality of lever members interconnecting said vibration frame with said stand frame; and
    a plurality of biasing members interconnecting said vibration frame with said stand frame.

* * * * *